July 30, 1957 J. T. DONAHOO 2,801,354
TERMINAL ARRANGEMENT FOR ELECTRIC MOTORS
Filed May 28, 1956
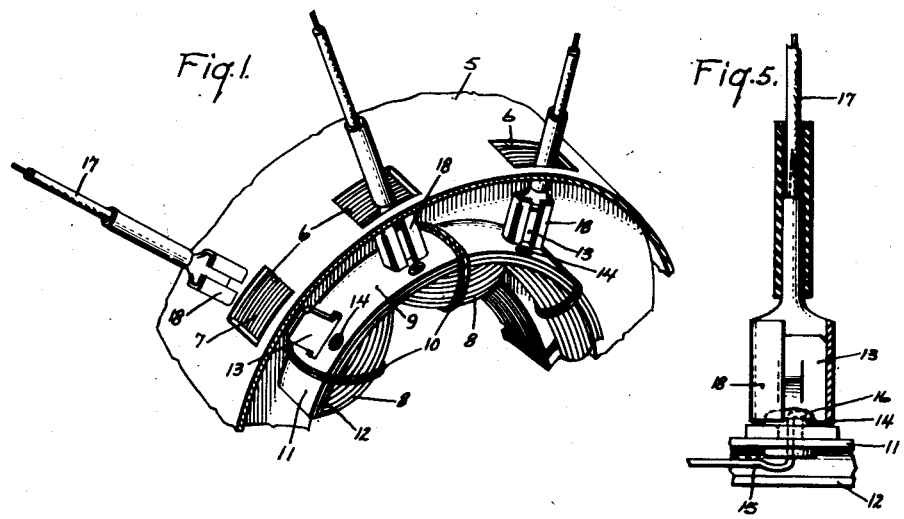
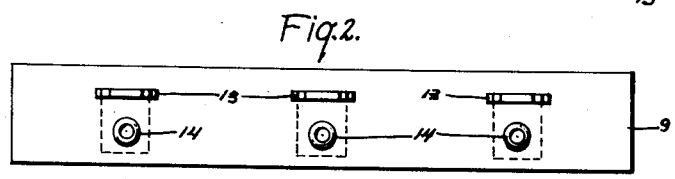
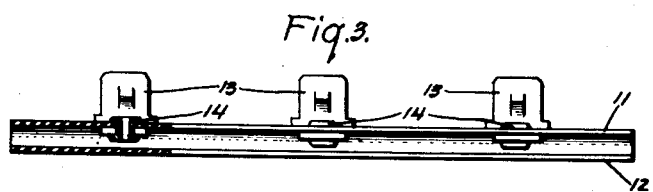
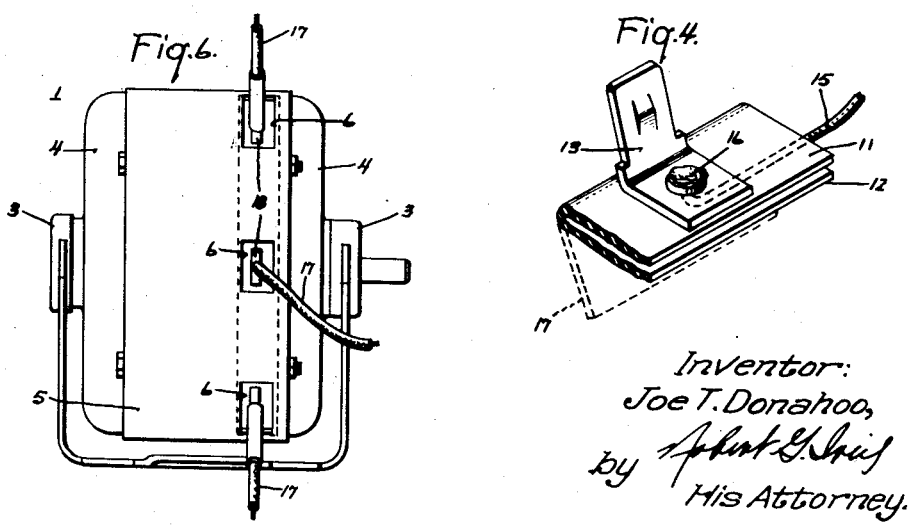
Inventor:
Joe T. Donahoo,
by
His Attorney.

United States Patent Office 2,801,354
Patented July 30, 1957

2,801,354

TERMINAL ARRANGEMENT FOR ELECTRIC MOTORS

Joe T. Donahoo, Fort Wayne, Ind., assignor to General Electric Company, a corporation of New York Application May 28, 1956, Serial No. 587,746

5 Claims. (Cl. 310—71)

This invention relates to dynamoelectric machines, and more particularly to electric motors arranged to have an improved construction to permit quick and simple connection to an outside terminal.

The connection of electric motors to the source of power which is to operate them has frequently been a relatively painstaking operation, frequently involving a certain amount of disassembly and subsequent reassembly before the properly assembled motor could be connected. While the extra time and trouble involved are a relatively small aggravation for the user of a single motor or a small number of motors, the problem becomes acute where a great many motors are involved. One example of this is, for instance, where motors are to be assembled into apparatus produced on an assembly line basis such as, for instance, room air-conditioners or blowers. Such items are produced in great numbers, and in each piece of apparatus there must be an electric motor properly assembled and suitably connected to the remainder of the apparatus. Unless the connection of the motor can be effected swiftly and simply, it adds greatly to the overall cost of the apparatus in which it is used by virtue of the extra labor involved in the assembly. Consequently, it is most desirable to provide a motor construction which will permit swift and simple connection of the motor to the outside source of power.

It is, therefore, an object of this invention to provide an improved motor construction incorporating the desirable features set forth above.

In its broader aspect, the invention provides an electric motor with a stationary core member and a winding positioned on the core member with end turns extending axially thereof. A housing for the motor is provided which includes a shell member secured about the core member and provided with openings in axial alignment with the end turns. The winding has terminals which are electrically connected to it, with each terminal being secured to the outer surface of the end turns in radial alignment with one of the openings.

Each terminal is thus readily accessible to one of the openings. Particularly in the case of that type of terminal where connection is completed by sliding a female member or a male member, the connection of the motor to outside lines is greatly facilitated, since the connection can be made merely by moving one of the connection members radially inwardly through the opening into mating engagement with the other of the members.

The features of the invention which are believed to be novel are set forth with particularity in the appended claims. The invention itself, however, together with further objects and advantages thereof, may best be understood by reference to the following description taken in connection with the accompanying drawing.

In the drawing, Figure 1 is a fragmentary view in perspective of an electric motor incorporating the improved construction of this invention;

Figure 2 is a plan view of a terminal assembly which may be utilized in the improved construction of the invention;

Figure 3 is a side view, partly in cross section, of the structure of Figure 2;

Figure 4 is is a fragmentary view in perspective showing a single terminal of the construction of Figures 2 and 3;

Figure 5 is a fragmentary side view, partly in cross section, showing the engagement of an outside terminal with a motor terminal; and Figure 6 is a side view of an electric motor incorporating the improved construction of the invention.

Referring now to the figures of the drawing, there is shown an electric motor generally indicated at 1 having a base 2 which engages the hubs 3 of end shields 4 which coact with a shell member 5 to form a motor housing. Shell member 5 is provided with openings 6 which have in the past been used exclusively for ventilation purposes. Within the motor housing there is provided a stationary motor core member 7, generally made up of a stacked plurality of thin laminations of magnetic material. A winding having end turns 8 is positioned on the core member 7 so that the end turns extend axially of the core member, as best seen in Figure 1.

In order to connect the windings to a source of energizing power, the arrangement hereinafter described is provided. A strip, or board, 9 of relatively stiff resilient insulating material, preferably bent over upon itself as shown, is secured to the outer surface of end turns 8 by any desired means such as, for instance, lacing 10. As best seen in Figures 2 through 5, the board member 9 is bent over upon itself to have an upper strip 11 and a lower strip 12, with a plurality of terminals 13 secured to the upper strip by any suitable means such as, for instance, rivets 14. Each terminal 13 is arranged to be secured to a coil end 15 by any desired means such as, for instance, soldering as shown at 16. The securing of the coil end to the terminal 13 is facilitated by bending lower strip 12 downwardly, as shown in dotted outline at 17, while coil end 15 is soldered, and then returning the strip 12 to its ordinary position. It will be observed that this arrangement makes the securement simple and at the same time the strip 12 provides protection between the connection and the end turns 8 themselves which otherwise might have their insulation injured by rough surfaces occurring at the point of connection. The terminals 13 are so arranged on board 9, and the board is so arranged on the end turns 8 that each terminal 13 is substantially radially aligned with a vent opening 6. In addition, where a quick connect type member such as terminal 13 is utilized, it is desirable to have each terminal 13 secured so that its axis, when extended, extends through the opening 6 with which it is radially aligned. Such an arrangement is shown in Figure 1. With the terminals 13 in this arrangement, it is then possible to effect a connection to an outside line 17 through a female member 18 electrically secured to line 17 which may be inserted through vent opening 6 into mating engagement with male terminal 13. Proper connection of the male and female terminals 13 and 18 is effected simply by radial insert of the female terminal 18 through the vent opening 6.

It will be seen from the foregoing that the radial alignment of the motor terminals with the vent openings in the shell act to greatly facilitate the connection of outside terminals to the motor terminals. In addition, this advantage is increased even more where the terminals are of the male and female quick connect type since connection is made by the absolute possible minimum of effect, that is, inserting the terminal through the vent opening.

It will, of course, be recognized that, while the invention has been described with a particular arrangement of male and female type quick connect terminals, other arrangements are possible. For instance, utilizing the same types of terminals, the male and female members may be inter-changed from the relationship shown in Figure 1, that is, the female member may be secured within the motor and the male member utilized for the outside terminal. By the same token, entirely different types of terminals may also be utilized to considerable advantage with the physical arrangement shown.

Thus, while the invention has been explained by describing a particular embodiment thereof, it will be apparent that improvements and modifications may be made without departing from the scope of the invention as defined in the appended claims.

What I claim as new and desire to secure by Letters Patent of the United States is:

1. An electric motor having a stationary core member, a winding positioned on said core member and having end turns extending axially thereof, a housing for said motor including a shell member secured about said core member and provided with openings in radial alignment with said end turns, and terminals electrically connected to said winding, each said terminal being secured to the outer surface of said end turns in radial alignment with one of said openings.

2. An electric motor having a stationary core member, a winding positioned on said core member and having end turns extending axially thereof, a housing for said motor secured about said core member and provided with an opening in radial alignment with said end turns, and a terminal electrically connected to said winding and secured to the outer surface of said end turns in radial alignment with said opening.

3. An electric motor having a stator member, a winding positioned on said stator member and having end turns extending axially thereof, a housing for said motor including a shell member secured about said stator member and provided with openings in radial alignment with said end turns, a board member rigidly secured to the outer surface of said end turns, a plurality of terminals spacedly mounted on said board member and electrically connected to said winding, each said terminal being arranged on said board member in radial alignment with one of said openings.

4. An electric motor having a stator member, a winding positioned on said stator member and having end turns extending axially thereof, a housing for said motor including a shell member secured about said stator member and provided with an opening in radial alignment with said end turns, a double thickness board member rigidly secured to the outer surface of said end turns, a plurality of terminals spacedly secured on said board member, said winding having its ends extending between the two thicknesses of said board member into engagement respectively with said terminals, each said terminal being arranged on said board member in radial alignment with one of said openings.

5. An electric motor having a stator member, a winding positioned on said stator member and having end turns extending axially thereof, a housing for said motor including a shell member secured about said stator member and provided with an opening substantially in radial alignment with said end turns, a male terminal of a male-female quick connect terminal assembly electrically connected to said winding and secured to the outer surface of said end turns, said terminal being arranged in radial alignment with said opening and with its axis extending substantially through said opening.

References Cited in the file of this patent
UNITED STATES PATENTS

| | | |
|---|---|---|
| 925,254 | Wiard | June 15, 1909 |
| 1,252,601 | Mason | Jan. 8, 1918 |
| 2,511,693 | Burghoff | June 13, 1950 |
| 2,627,584 | Schultz | Feb. 3, 1953 |